Patented July 13, 1937

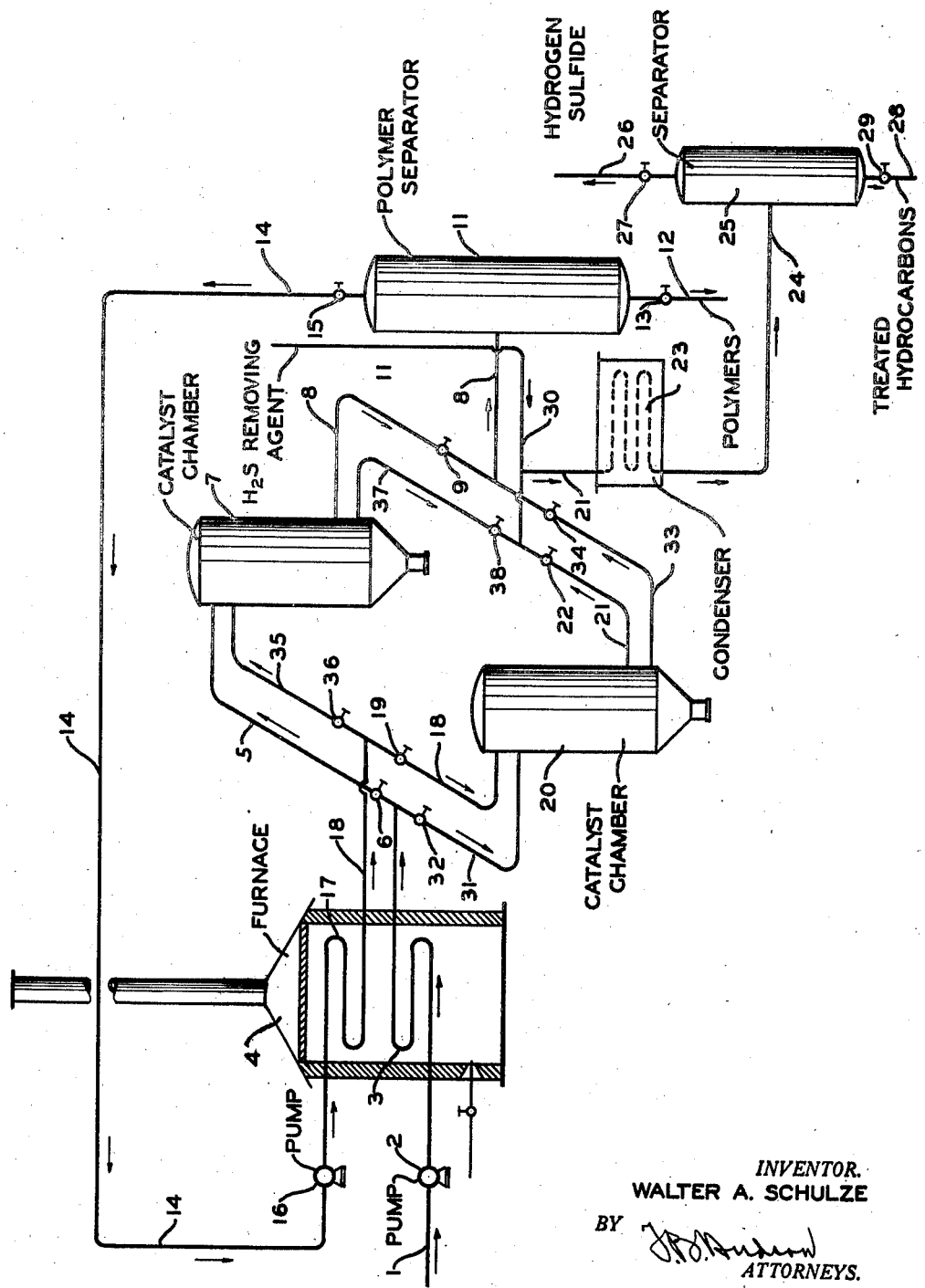

2,087,048

UNITED STATES PATENT OFFICE 2,087,048

TREATMENT OF HYDROCARBON OILS

Walter A. Schulze, Bartlesville, Okla., assignor to Phillips Petroleum Company, Bartlesville, Okla., a corporation of Delaware Application June 20, 1935, Serial No. 27,582

6 Claims. (Cl. 196—28)

This invention relates to a process for the catalytic treatment of hydrocarbons and relates particularly to a process for catalytic desulfurization of petroleum hydrocarbons.

In a previous application Serial No. 632,608 filed September 10, 1932 of which I am co-inventor there is described a process for the catalytic desulfurization of petroleum hydrocarbons which comprises passing petroleum vapors containing objectionable sulfur compounds over a desulfurization catalyst, namely bauxite, at temperatures specifically suited to effect decomposition of the sulfur compounds to hydrogen sulfide and followed by removal of the hydrogen sulfide.

I now propose to effect an improvement in this process whereby more efficient desulfurization is effected and the life of the catalyst markedly prolonged.

I have found that in carrying out the above process, the catalyst when acting upon petroleum fractions, particularly those containing unsaturated constituents will be rendered ineffective in a comparatively short time due to its becoming contaminated by polymers formed from unsaturated constituents in the petroleum vapors and by carbonaceous matter formed probably as a result of the decomposition of sulfur compounds. I therefore propose to increase the effective life of the catalyst by pretreating the hydrocarbons so as to remove a major portion of those constituents which will form polymers and contaminative carbonaceous matter when brought in contact with the catalyst.

As mentioned briefly above, I have found that contamination of the desulfurization catalyst in a process such as that disclosed in my co-pending application is apparently due to two factors, one, polymers formed from certain unsaturated constituents in the vapors treated, and the other, polymers or carbonaceous or tarry matter formed from the products of decomposition of the sulfur compounds.

I have also found that certain of the sulfur compounds found in petroleum are more readily decomposed by vapor phase treatment with my preferred catalyst, bauxite, than certain other of these sulfur compounds. For example, n-butyl mercaptan is much more readily and completely decomposed than dimethyl sulfide. Diphenyl sulfide, also, is less readily decomposed than the aliphatic sulfides except methyl. By taking advantage of the great difference in stability of these sulfur compounds it is possible by the process disclosed herein to obtain much more efficient and complete removal of the sulfur from the petroleum oil.

Prior to this discovery it has been the practice to pass the petroleum vapors over the bauxite catalyst at a temperature sufficiently high to break down the major part of these sulfur compounds. For a short time with a fresh catalyst the activity was sufficiently high so that the less readily decomposable compounds such as the dimethyl sulfide and diphenyl sulfide were attacked, but as the catalyst became contaminated with carbonaceous matter resulting from the decomposition of the sulfur compounds and polymerization of the highly unsaturated hydrocarbons the catalyst decreased in activity with the result that the more stable sulfur compounds were untouched. It became necessary then to raise the temperature still higher to compensate for the loss in activity of the catalyst, and this increase in temperature, of course, caused the rate of formation of carbonaceous matter to be speeded up, thereby accelerating the rate of loss of activity. I have found now that the aforementioned difficulties can be avoided by operating in the manner disclosed below.

In my process the petroleum vapors are treated catalytically in two steps. In the first step the vapors are passed over a bauxite catalyst at temperatures sufficiently high to decompose the more readily decomposable sulfur compounds. The carbonaceous residues from this decomposition together with the polymeric bodies formed from the highly unsaturated hydrocarbons are deposited in the catalyst bed. After an extended period of operation, depending on the stock being treated, the amount of liquid and tarry deposition may be sufficient to collect at the bottom of the catalyst bed from which it may be drained. In order to remove any entrained high boiling polymeric material from the treated vapors, they may be passed through a polymer separator prior to the second catalytic step.

By removing from the vapors a major portion of the carbonaceous forming constituents in the first step, the catalyst in the second step is then permitted to act more exclusively as a desulfurizing agent for the more stable sulfur compounds and its activity for this purpose is thus heightened and prolonged.

The preferred temperatures for this two step operation are 600–700° F. for the first step and 650–800° F. for the second step. It has been found advantageous to maintain the temperature in the second step somewhat higher than that used in the first step so that the vapors are above their dew point and the catalyst is maintained as free as possible of liquid particles which in time tend to form carbonaceous residues. In such operation the vapors coming from the polymer separator are superheated some 25 to 50 degrees Fahrenheit above that in the first catalyst chamber.

After the second catalyst treatment the hydrogen sulfide is removed from the treated vapors by any of the usual methods such as (1) fractionation, or (2) extraction with alkali.

I have also found that when the second step catalyst begins to lose effectiveness for decomposing the less readily decomposable sulfur compounds it will still retain considerable effectiveness toward the more-readily decomposable sulfur compounds as well as suitable efficiency as a polymerizing agent toward unsaturated materials. I therefore am enabled to effect additional economies in my process by using the second step catalyst as the first step catalyst when it begins to lose effectiveness toward the less-readily decomposable sulfur compounds, and I can thus obtain an extended period of usefulness from such catalyst.

Other objects and advantages of my new invention will be apparent from the following detailed description taken in conjunction with the attached drawing which illustrates a diagrammatic form of apparatus for successfully practicing the invention.

Referring to the drawing petroleum hydrocarbons to be desulfurized will be fed through pipe 1 in which is mounted a pump 2 and will be pumped thereby through a heating coil 3 which is mounted in a furnace 4. From the furnace 4 the hydrocarbons will pass through a pipe 5 in which is mounted a valve 6 into a catalyst chamber 7, in which is maintained a bed of catalytic material such as bauxite. The hydrocarbons in passing through the heating coil 3 will be heated by gases of combustion generated in the furnace 4 to such a temperature as to effect substantially complete vaporization of the hydrocarbons. The temperature will be sufficiently high so that the more readily decomposable sulfur compounds contained in the vapors will be decomposed by the action of the bauxite which will at the same time effect polymerization of the highly unsaturated hydrocarbons contained in the vapors and other polymer or gum forming material formed as a result of the decomposition of the sulfur compounds. The vapors will be constrained to pass through the body of catalyst contained in chamber 7 and the catalyst will be maintained substantially at the temperature of the vapors by the heat of the vapors themselves. Catalyst chamber 7 will be suitably insulated to reduce heat losses therefrom to a minimum.

From catalyst chamber 7 the treated vapors and polymeric liquid will pass through a pipe 8 in which is mounted a valve 9 into a polymer separator 11 wherein the polymers will be separated from the treated vapors. Polymer separator 11 may be a simple separator or a fractionating tower or any other similar device which will effect a suitable separation of vapors from polymers and other liquid constituents. The polymers and other liquid constituents will be withdrawn from polymer separator 11 through a pipe 12 in which is mounted a valve 13, the manipulation of which will control the rate of withdrawal of polymers from the system. The vapors freed from the major portion of polymer forming materials and less refractory sulfur compounds and containing substantially only more refractory sulfur compounds will pass from polymer separator 11 through a pipe 14 in which is mounted a valve 15 and assisted if necessary by a pump 16 will be fed through a heating coil 17 also mounted in furnace 4, and from furnace 4 through a pipe 18 in which is mounted a valve 19 into a second catalyst chamber 20 in which is maintained a second body of bauxite catalyst. The vapors passing through coil 17 will be heated by gases of combustion generated in the furnace 4 to a temperature substantially above that to which the original material was heated in coil 3. These higher temperature vapors will be constrained to pass through the catalyst in chamber 20 wherein the catalyst will act upon the vapors to decompose the more refractory sulfur compounds remaining in the vapors. The bed of catalyst in chamber 20 will be maintained at the higher temperature required by the vapors themselves, this chamber also being suitably insulated to reduce heat losses to a minimum. The treated vapors containing hydrogen sulfide which is the principal decomposition product of sulfur compounds will pass from chamber 20 through a pipe 21 in which is mounted a valve 22 through a condenser 23 wherein the hydrocarbons will be condensed together with hydrogen sulfide some of which may remain uncondensed. The mixture of condensate and uncondensed hydrogen sulfide will then pass from condenser 23 through a pipe 24 into a separator 25 wherein the hydrogen sulfide will be separated from the desulfurized hydrocarbons. The hydrogen sulfide may be separated from the hydrocarbons by fractionation and will be vented from separator 25 through a pipe 26 in which is mounted a valve 27. The desulfurized hydrocarbons will be withdrawn from separator 25 to storage through a pipe 28 in which is mounted a valve 29.

Instead of effecting a physical separation of hydrogen sulfide from the desulfurized hydrocarbons, the hydrogen sulfide may be removed by a chemical agent as for example caustic soda solution or the like. If the chemical method is used, the hydrogen sulfide removing agent may be fed through a pipe 30 into pipe 21 at a point preceeding condenser 23 and it will neutralize and dissolve the hydrogen sulfide en route to separator 25. The desulfurized hydrocarbons and the solution of hydrogen sulfide in the removing agent will then be separated from each other either in separator 25 or by any suitable conventional means, depending upon the particular nature of the hydrogen sulfide removing agent.

It will be understood that removal of hydrogen sulfide from the treated hydrocarbons by chemical means may be effected after the condensation instead of before as shown. For example the liquid hydrocarbons containing hydrogen sulfide may be washed with a suitable chemical in separator 25 or in apparatus subsequent to separator 25, such methods being well known in the art.

The process may be operated at a pressure, that is sufficient only to overcome the pressure drop through the apparatus or it may be operated at substantial superatmospheric pressure throughout, in which case valve 27 may be manipulated to control the pressure on the system, or the initial heating in coil 3 may be conducted at superatmospheric pressure which will then be controlled by manipulation of valve 6. If catalyst chamber 7 is to be included with coil 3 in the superatmospheric zone the desired pressure may be controlled by means of valve 9, and so on through the system. Catalyst chambers 7 and 20 may be maintained under the same pressure or different pressures, as may be desired.

The time of contact of the vapors with the catalyst may be greater or less in one chamber than in the other, or it may be the same in both depending upon the nature of the material charged, and the degree of desulfurization desired.

The temperature maintained in catalyst chamber 7 will vary generally between 600 and 700° F. depending largely upon the nature of the material treated. The temperature in chamber 20 will generally be somewhat higher than that in chamber 7 being most usually between 650 and 800° F. as conditions dictate.

While I have given bauxite as my preferred catalyst for both steps of my process, I may use other catalysts, such as the oxides and sulfides of the metals whose oxides are grouped as dehydration and dehydrogenation catalysts, e. g., aluminum, tungsten, vanadium, chromium, cadmium, zinc, molybdenum, etc. and their minerals such as chromite, vanadinite, molybdenite, molybdite, descloizite, wolframite, etc. I may use the same catalyst in both chambers or I may use different catalysts. Mixtures of these catalysts may also be used. The type of catalyst used will to some extent control the temperature maintained in each of the steps of the process and the contact time factor.

I may also use fuller's earth, particularly in the first step of the process, but I find it less advantageous than some of the other catalysts for this purpose for the reason that at the relatively high temperatures necessary to effect decomposition of even the more readily decomposable sulfur compounds, the fuller's earth apparently tends to effect over-polymerization of the polymer forming materials in the hydrocarbons undergoing treatment, forming very heavy polymers such as tars which quickly clog or poison even the first step catalyst.

The following specific examples will serve to illustrate the advantages arising from my improved process.

*Example 1.*—Cracked gasoline from Texas-Panhandle crude with a sulfur content of 0.110 per cent is passed in the vapor state at a temperature of about 660° F. through a first catalyst chamber containing bauxite as catalyst. The treated vapors then are passed in succession through a polymer separator and a superheating coil wherein the temperature is raised to 710° F. The superheated vapors are then passed at substantially the same temperature through a second catalyst chamber containing bauxite as catalyst, after which the vapors are cooled and the hydrogen sulfide is removed from the hydrocarbons. Typical results on starting with fresh catalyst in both chambers are as follows:

| Number of barrels of gasoline treated per ton of catalyst | Sulfur content after first catalyst chamber ($H_2S$ free basis) | Sulfur content after second catalyst chamber ($H_2S$ free basis) |
| --- | --- | --- |
| | *Percent* | *Percent* |
| End of 100 | 0.075 | 0.065 |
| 500 | 0.090 | 0.067 |
| 1000 | 0.095 | 0.070 |
| 1500 | 0.096 | 0.072 |

Original sulfur content 0.110%.

*Example 2.*—In flash distilling a Panhandle crude a gas oil and lighter cut comprising about 70% of the crude taken overhead from the hot oil separator at a temperature of about 730° F. and an organic sulfur content of 0.190 percent is passed through a first catalyst chamber containing bauxite as catalyst. Following this treatment the vapors are passed through a polymer separator and then through a heating coil whereby the temperature is raised to 750° F. The superheated vapors are then passed without substantial cooling through a second catalyst chamber containing bauxite as catalyst, after which the vapors are fractionated into three fractions, namely, gasoline, naphtha and gas oil. The hydrogen sulfide which was formed as a result of the decomposition of the organic sulfur compounds during the catalytic treatment may be separated from the gasoline by fractionation, by extraction with alkali or by any of the usual methods. Typical results are as follows:

| Number of barrels of gas oil and lighter fraction treated per ton of catalyst | Sulfur content of composite fraction after first catalyst chamber ($H_2S$ free basis) | Sulfur content of composite fraction after second catalyst chamber ($H_2S$ free basis) |
| --- | --- | --- |
| | *Percent* | *Percent* |
| End of 100 | 0.081 | 0.065 |
| 400 | 0.115 | 0.068 |
| 800 | 0.135 | 0.070 |
| 1200 | 0.140 | 0.075 |

Original sulfur content 0.190%.

As previously mentioned I have found that when the second step catalyst has reached such a point of reduced effectiveness toward the less readily decomposable sulfur compounds as to warrant replacing it with fresh catalyst, it will still retain considerable efficiency in effecting decomposition of the more readily decomposable sulfur compounds at the lower temperatures required as well as marked efficiency in polymerizing the unsaturates in the vapors.

When the second step catalyst has reached such a point the following method of operation may be conducted, again referring to the drawing for a fuller understanding of this modification.

When the process described above has reached the point where replacement of the second step catalyst is warranted, valve 6 in pipe 5 will be closed and the heated material leaving coil 3 will pass through a pipe 31 in which is mounted a valve 32 into catalyst chamber 20, valve 32 being opened of course to permit such passage of heated materials. The vapors generated as a result of the heating in coil 3 as described above will pass through the catalyst in chamber 20 and the catalyst will act to decompose the more readily decomposable sulfur compounds contained in the vapors and to polymerize the highly unsaturated hydrocarbons and decomposition products of the sulfur compounds. Valve 22 in pipe 21 will be closed and vapors will then pass through a pipe 33 in which is mounted a valve 34 into pipe 8, valve 9 in pipe 8 now being closed, and thence into polymer separator 11. From this point the flow of vapors and polymers will be the same as in the previously described operation until after the vapors leave the superheating coil 17, whereupon valve 19 in pipe 18 will be closed and the superheated vapors will then pass through a pipe 35 in which is mounted a valve 36 now opened, into catalyst chamber 7 which is now filled with fresh bauxite and acts as previously described, to decompose the less readily decomposable sulfur compounds in the vapors. Valve 9 in pipe 8 being closed the vapors will then pass from chamber 7 through a pipe 37 in which is mounted a valve 38, now opened, and will pass thence into pipe 21 and continue from this point in the same manner as previously described, until the new catalyst in chamber 7 begins to lose its efficiency when the flow through the two chambers 7 and 20 will again be altered in the manner indicated. I am thus enabled to obtain increased efficiency from a single batch of catalyst and may thus effect appreciable additional economics thereby.

Other variations of my new process will be apparent to those skilled in the art and it is my intention to claim all such variations within the scope of my invention as defined by the appended claims.

I claim:

1. The process of desulfurizing hydrocarbon oil, which comprises passing the said hydrocarbon oil in vapor form through a first body of bauxite catalyst at a temperature within the range of 600 to 700° F., whereby the more readily decomposable organic sulfur compounds in the hydrocarbon vapors are decomposed by the said catalyst into simpler sulfur compounds and whereby the polymer forming constituents which are deleterious to the desulfurization activity of bauxite catalyst are polymerized and removed by condensation from the said hydrocarbon vapors, superheating the resultant partially desulfurized vapors, passing said superheated vapors through a second body of bauxite catalyst maintained at a temperature substantially higher than that maintained in said first body of catalyst, whereby the less readily decomposable organic sulfur compounds are decomposed into simpler sulfur compounds, and finally removing the decomposed sulfur compounds from the treated hydrocarbon oil.

2. The process of desulfurizing petroleum oil, which comprises passing the said petroleum oil in vapor form through a first body of bauxite catalyst at a temperature within the range of 600 to 700° F., whereby the more readily decomposable organic sulfur compounds in the petroleum vapors are decomposed by the said catalyst into hydrogen sulfide and whereby the polymer forming constituents which are deleterious to the desulfurization activity of bauxite catalyst are polymerized and removed by condensation from the said petroleum vapors, superheating the resultant partially desulfurized and purified vapors to a temperature higher than that maintained in said first body of catalyst and passing said superheated vapors through a second body of bauxite catalyst without substantial cooling of the superheated vapors, whereby the less readily decomposable organic compounds are converted into hydrogen sulfide, and finally removing the hydrogen sulfide from the treated petroleum oil.

3. The method of increasing the effective life of a bauxite catalyst for desulfurizing petroleum oil, comprising passing said petroleum oil in the vapor form at a temperature within the range of 600 to 700° F. through a first treating chamber containing bauxite catalyst, whereby part of the organic sulfur compounds are converted into hydrogen sulfide and the tar forming constituents in the petroleum vapors are polymerized to high boiling compounds which are condensed to liquid state on the bauxite catalyst, then superheating the partially desulfurized petroleum vapors and while at a temperature substantially higher than that maintained in said first treating chamber passing the said vapors through a second treating chamber containing bauxite catalyst, whereby less readily decomposable organic sulfur compounds are converted into hydrogen sulfide, and finally removing the hydrogen sulfide from the desulfurized petroleum oil.

4. In a process for the catalytic desulfurization of hydrocarbons, wherein said hydrocarbons in vapor form are contacted with a desulfurization catalyst consisting of bauxite, the improvement which comprises contacting hydrocarbon vapors with a first body of bauxite catalyst at a temperature in the range 600 to 700° F. thereby decomposing more readily decomposable sulfur compounds contained in the said vapors and polymerizing the highly unsaturated hydrocarbons and tar forming materials in said vapors, separating resulting polymers and carbonaceous materials from said vapors then passing the partially desulfurized and purified vapors in contact with a second body of said bauxite catalyst at a temperature in the range 650° F. to 800° F. to thereby decompose the less readily decomposable sulfur compounds contained in said vapors into hydrogen sulfide and removing said hydrogen sulfide from the treated hydrocarbons.

5. The improved method of converting organic sulfur compounds in cracked gasoline into hydrogen sulfide which comprises passing said cracked gasoline in vapor form in contact with a first body of bauxite maintained at a temperature within the range of 600 to 700° F., whereby the more readily decomposable organic sulfur compounds in the cracked gasoline vapors are decomposed by the said catalyst into simpler sulfur compounds and whereby the polymer forming constituents which are deleterious to the desulfurization activity of bauxite catalyst are polymerized, removing the said polymers by condensation from the said cracked gasoline vapors, thereafter passing the resulting partially treated vapors in contact with a second body of bauxite maintained at a temperature at least 25° F. higher than that maintained in said first body of bauxite and finally removing the decomposed sulfur compounds from the treated cracked gasoline.

6. The improved method of converting into hydrogen sulfide the organic sulfur compounds in a mixture of petroleum fractions consisting of gas oil and lighter fractions, which comprises passing said mixture in vapor form in contact with a first body of bauxite maintained at a temperature in the range 600-730° F., whereby the more readily decomposable organic sulfur compounds in the said vapor mixture are decomposed by the said catalyst into simpler sulfur compounds and whereby the polymer forming constituents which are deleterious to the desulfurization activity of bauxite catalyst are polymerized, removing the said polymers by condensation from the said vapor mixture, thereafter passing the resulting partially treated vapors in contact with a second body of bauxite maintained at a temperature above 730° F., whereby the less readily decomposable organic sulfur compounds are decomposed into simpler sulfur compounds, and finally removing the decomposed sulfur compounds from the treated mixture of petroleum fractions.

WALTER A. SCHULZE.